United States Patent [19]
Satoh et al.

[11] Patent Number: 5,387,391
[45] Date of Patent: Feb. 7, 1995

[54] PROCESS OF MAKING A RESIN PANEL

[75] Inventors: Yukio Satoh, Muroran, Japan; Owen R. Maher, Grosse Point, Mich.

[73] Assignees: Nissan Motor Co., Ltd., Tokyo, Japan; General Electric Co., N.Y.

[21] Appl. No.: 84,042

[22] Filed: Jun. 28, 1993

[51] Int. Cl.⁶ .............................. B29D 22/00
[52] U.S. Cl. .................. 264/572; 264/328.8; 264/328.12; 264/328.13
[58] Field of Search .......... 264/85, 328.8, 328.12, 264/328.13, 572

[56] References Cited

U.S. PATENT DOCUMENTS

| | | |
|---|---|---|
| 4,866,883 | 9/1989 | Brown et al. .................. 49/502 |
| 5,040,334 | 8/1991 | Dossin et al. ................. 49/502 |
| 5,050,351 | 9/1991 | Goldbach et al. ............. 49/502 |

OTHER PUBLICATIONS

Rusch, K. C. "Gas-Assisted Injection Molding–The New Thermoplastic Molding Technology for Exterior Body Panels", Presented at the Meeting of the Society of Automotive Engineers, Mar. 2, 1989, pp. 1–8.

Primary Examiner—Leo B. Tentoni

[57] ABSTRACT

A structurally reinforced panel for a vehicle body includes an injection molded resin panel having an integrally molded hollow reinforcement truss extending across the panel.

7 Claims, 2 Drawing Sheets

PROCESS OF MAKING A RESIN PANEL

CROSS REFERENCE TO RELATED APPLICATIONS

This application is related to concurrently filed pending application Ser. Nos. 08/084038, 08/084043, and 08/084653 the entire disclosures of which are incorporated herein by reference.

BACKGROUND OF THE INVENTION

1. Field of the Invention

The present invention relates to resin panels and more particularly to resin panels requiring structural reinforcement to increase resistance to deformation.

2. Technology Review

It is known to make outer panels of a vehicle body from a resin material by injection molding techniques. Such outer resin panels often require structural reinforcement to increase resistance to deformation by a force applied to an exterior surface of the panel. For example, an outer resin panel of a vehicle door assembly requires reinforcement in the upper region of the panel where the panel is curved toward the top edge bordering the windowsill. Such reinforcement is required in order to meet squeeze test specifications to which the door panels are subjected.

In the past, such structural reinforcement to increase the strength and stiffness of the top region of the door outer resin panel was provided by bonding a separate piece to the inner surface of the outer panel between the front and rear edges thereof to form a hollow truss section. This is shown in FIG. 1 which illustrates a cross-section of the upper region of such a door panel wherein a separate piece 2 is bonded to the inner surface of an outer door panel 4 for creating a truss section 6. As can be seen, this creates a double thickness in the region of the bonds 8. This has the undesirable result that sink marks occur at the outer surface of the outer panel that correspond to the bonded surface. The sink marks damage the quality of appearance of the exterior surface of the outer panel. Moreover, the bonding of a separate reinforcement part to the outer panel results in higher manufacturing costs due to the additional expenses required for the tooling required to make the separate part and for bonding the two parts together. Furthermore, the overall weight of the outer panel is increased due to the double wall thickness in the region of the bond.

Another construction that has been considered to solve the requirement for structural reinforcement in the area of the curved upper region of an outer door resin panel is shown in FIG. 2 wherein ribs 10 and 12 are molded as integral parts to the inner surface of outer door panel 4. While such ribs increase the stiffness of the panel in its upper curved region, such integrally molded ribs also create sink marks in the exterior surface opposite the location of the ribs, damaging the quality of appearance of the exterior surface of the panel.

SUMMARY OF THE INVENTION

It is an object of the present invention to provide a resin panel with structural reinforcement in regions requiring increased resistance to deformation in such a manner that will maintain a high quality exterior finish for the panel.

It is a further object of the invention to provide a resin panel with structural reinforcement with minimal tooling and manufacturing costs.

It is another object of the invention to provide a resin panel with structural reinforcement in a manner that adds as little weight as possible to the resulting product.

The above and other objects are accomplished according to the invention by the provision of a structurally reinforced panel for a vehicle body, including an injection molded resin panel having an integrally molded hollow reinforcement truss extending across the panel.

Such an integrally molded hollow reinforcement truss can be created in a resin panel by known techniques of gas assisted injection molding as described, for example, by Ken C. Rusch, *Gas-Assisted Injection Molding—A New Technology is Commercialized*, Plastics Engineering, Vol. 45, No. 7, July 1989. In the gas-assisted injection molding process, a mold is partially filled with plastic and a gas is injected into the flow of the plastic in order to create a hollow channel in the plastic which displaces the molten plastic from the thicker sections and pushes it into extremities of the tool to pack out the molded part. In the above article by Rusch, the gas is injected by a nozzle integrated into the injection gate. However, techniques known as Cinpress II, have been developed in which gas is injected into the molten plastic in the mold through a nozzle which is located remote from the gate.

While gas-assisted injection molding techniques developed to date result in minimizing sink marks by several orders of magnitude less than what would occur in a conventional injection molding technology, sink marks, though much reduced, still appear where one wall adjoins another wall. Since even minimal sink marks are not acceptable for a Class A finish for the exterior surface of an outer panel of an automotive body, it is a further aspect of the invention to form the integrally molded hollow reinforcement truss in a region of an intended character line on an exterior surface of an outer panel so that any deformation or change in the exterior surface due to the formation of the integrally molded hollow reinforcement truss blends in with the intended character line.

In accordance with another feature of the invention, the integrally molded hollow reinforcement truss is employed in the curved upper region of a vehicle door outer panel. This solution for structural reinforcement of the outer door panel in the upper curved region is far superior to the prior techniques of bonding a separately molded piece to the outer door panel which results in the disadvantages discussed above, namely increased manufacturing expense, more complex tooling and increased weight.

The provision of an integrally molded hollow reinforcement truss in an outer panel of a vehicle body in accordance with the invention can further be utilized to create an integrally molded rub strip on the outer panel of a vehicle outer door panel while simultaneously providing structural reinforcement in the central region of the outer panel. Additionally, since an integrally molded rub strip in accordance with the invention inherently has character lines where the bulge is created by the channel created by gas-assisted injection molding, any sink marks or other change in the exterior surface remains unnoticed because it blends in completely with the character lines.

DETAILED DESCRIPTION OF THE PREFERRED EMBODIMENTS

Figure 1:
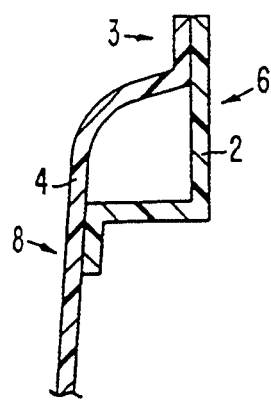
FIG. 1 is a cross-sectional view of an upper region of a vehicle outer door panel including structural reinforcement in accordance with the prior art.
Figure 2:
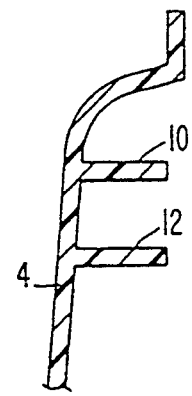
FIG. 2 is a cross-sectional view of an upper region of a vehicle outer door panel showing another embodiment of a prior art reinforcement.
Figure 3:
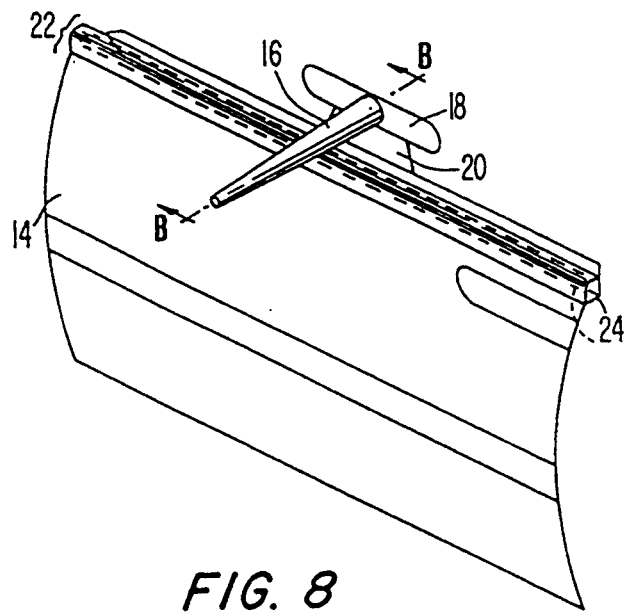
FIG. 3 is a schematic perspective view of an outer door panel and injection molding apparatus for creating a door in accordance with the principles of the invention.

Referring to FIG. 3, there is shown a vehicle door outer panel 14 which is injection molded from a resin material supplied through a sprue 16 by way of a primary runner 18 and a gate 20. In an upper region 22 of outer panel 14, which is generally curved as it approaches the windowsill of the door, there is provided an integrally molded hollow truss 24 in accordance with the principles of the invention.

Figure 4:
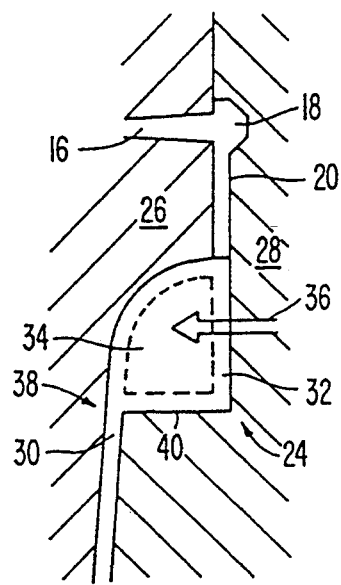
FIG. 4 is a partial cross-sectional view through line BB in FIG. 3 and further illustrating the mold halves forming the cavity defining the outer door panel to be formed.

Referring to FIG. 4, there is shown the mold halves 26, 28 for forming upper section 22 with the integrally molded hollow truss 24. A mold cavity 30 defined between mold halves 26 and 28 includes an internal or secondary runner 32 which functions as a runner in which the resin material is injected by way of sprue 16, primary runner 18 and gate 20. A hollow channel 34 is formed in the secondary runner 32 by gas-assisted injection molding whereby an inert gas, such as nitrogen, is injected into secondary runner 32 through a gas nozzle 36. The combination of high surface tension and low viscosity of the hot plastic resin melt in the central section of secondary runner 32 results in the formation of hollow channel 34 and thus the creation of the hollow integrally molded truss 24. The pressure of the injected gas is held constant until the mold cools and then is relieved by suitable venting prior to opening the mold.

Figure 5:
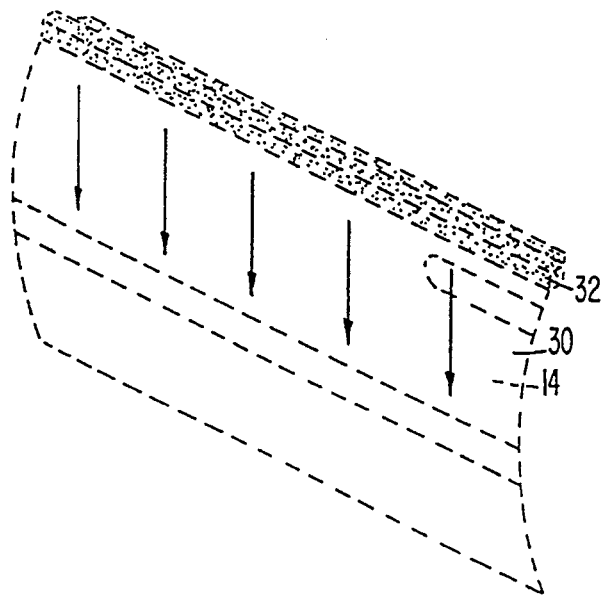
FIGS. 5-7 are schematics showing sequential steps in the gas-assisted injection molding process used to form an outer door panel with a hollow reinforcement truss in the upper region of the door panel in accordance with the invention.
Figure 6:
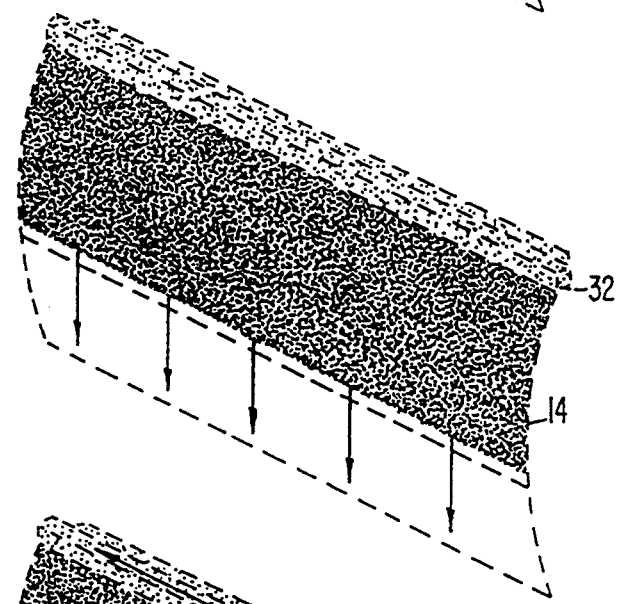
Figure 7:
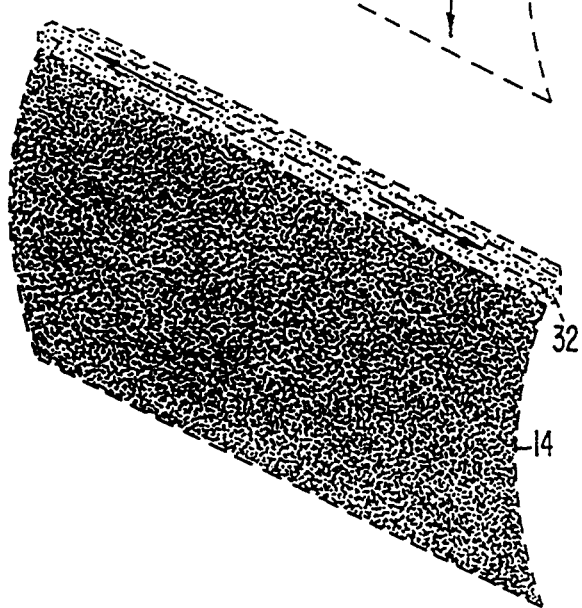

FIGS. 5-7 schematically illustrate various stages of forming an outer door panel by injection molding with the use of gas-assisted injection molding techniques. These figures illustrate the mold cavity with the mold halves being removed from the figures. As shown in FIG. 5, a short shot is introduced from the top of the mold by way of sprue 16, primary runner 18 and gate 20 (see FIGS. 3 and 4). The resin material fills the secondary runner 32 and when the resin material has spread further into cavity 34 below secondary runner 32 as shown in FIG. 6, a gas is injected by way of gas nozzle 36 (see FIG. 4) into secondary runner 32 which simultaneously forms hollow channel 34 and pushes the molten resin material downward to fill in the remainder of cavity 30. Upon cooling, mold halves 26 and 28 (FIG. 4) are removed and the outer door panel with the integrally molded hollow truss 24 is obtained.

Thus, the stiffness of the product is produced at the time of molding due to the formation of the integrally molded truss 24 and the occurrence of a sink mark at the location of the truss is minimized by virtue of the gas-assisted injection molding process. The creation of the hollow integrally molded truss during the injection molding process for creation of the outer panel avoids the expense required for molding a separate component and the further expense of bonding the separate component to the panel as required by prior techniques for increasing resistance to deformation. The manufacture of an outer door panel with an integrally molded hollow truss in accordance with the invention involves only the marginal manufacturing costs of retrofitting gas-assisted injection molding equipment to a conventional injection molding apparatus with the result that the product can be produced at a lower cost compared to prior art techniques. Moreover, because the invention eliminates the requirement to bond two separate components together to form the structural reinforcement for the panel, the weight of the panel is reduced and the occurrence of a sink mark on the back side of the bonded surface or on the back side of any ribs as discussed previously is minimized in a manner that improves the overall quality of appearance of the product.

The gas-assisted injection molding process has been found to work with any thermoplastic, including the class of thermoplastics which are well known for producing Class A finishes which can be used for the exterior surface of an outer panel of an automobile body.

The present invention is not limited to the method described above. It is additionally possible in accordance with the principles of the invention to utilize a method of injecting the resin to a secondary runner directly from a sprue without the use of a primary runner and gate as illustrated in FIGS. 3 and 4. Further, while the above example is in the context of producing an outer panel for a door, it is should be obvious that the principles of the invention could be applied to other components, such as other outer panels for vehicles, such as a hood, truck lid, fender and roof.

In accordance with a further aspect of the invention, since the gas-assisted injection molding process does not necessarily eliminate the occurrence of sink marks, although as discussed above, such sink marks are significantly reduced, it may be desirable in certain cases to design the outer surface of the outer panel to have a character line at the point at which a sink mark may be created. This is illustrated by reference numeral 38 in FIG. 4 wherein a character line is shown opposite leg 40 of integrally molded truss 24.

Figure 8:
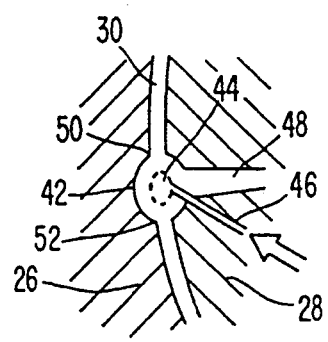
FIG. 8 is a partial cross-sectional view through a mold used to form an integrally hollow reinforcement truss which also serves the function of a molded rub strip by the gas-assisted injection molding process in accordance with the principles of the invention.

The principles of the invention can also be used to provide structural reinforcement in a central location of an outer door panel where a rub strip is traditionally placed. In the past, the rub strip comprised a separate component fastened in a recess formed in the outer panel. The present invention not only eliminates the need for a separate rub strip component, but also provides structural reinforcement. As shown in FIG. 8, wherein like reference numerals represent like parts, a hollow integrally molded truss in the shape of a "T" is created by the gas-assisted injection molding process previously described. By appropriately shaping the mold and the use of the gas-assisted injection process, the integrally molded hollow truss which provides stiffening to the central portion of the outer panel simultaneously constitutes a rub strip 42. In a manner analogous to that discussed above in connection with FIGS. 3 and 4, a hollow channel 44 is created by gas-assisted injection molding by introducing an appropriate inert gas through a gas nozzle 46 which causes the molten plastic to simultaneously form the channel and be displaced to fill out extremities of the mold, which may include a rib 48 to provide added stiffening and structural strength to the central portion of the panel so formed. The creation of any sink marks at points 50, 52 are hidden by virtue of the character lines which are present as a result of the design of the rub strip 42. Thus, any sink marks are totally hidden by being blended in with the intended character lines.

While the present invention has been described in conjunction with preferred embodiments and variations thereof, one of ordinary skill in the art will be able to effect various changes, substitutions, modifications and alterations without the departing from the scope of the invention as defined by the appended claims and equivalents thereof.

What is claimed is:

1. A method of producing a resin panel in an injection mold, comprising:

introducing a short shot of molten resin material from the top of the mold through a sprue and a primary runner;

filling a secondary runner in the area of the panel which requires reinforcement in a longitudinal direction with resin material using a sprue;

sending said resin material uniformly from said secondary runner;

supplying a gas to said secondary runner, said gas forming a hollow section therein, said gas pushing said resin material from said secondary runner downward to fill the remainder of the mold with molten resin material;

cooling the mold; and removing the panel from the mold whereby a panel is produced which has an integral molding truss formed by the hollow section and the panel is stiffened thereby.

2. The method of claim 1 wherein the panel is an vehicle door outer panel.

3. The method of claim 2 additionally comprising applying to the outer surface of the panel at the point at which a sink mark appears a character line whereby the sink mark is hidden.

4. The method of claim 2 wherein the hollow section of the panel is a rub strip.

5. The method of claim 1 wherein the panel is a vehicle hood.

6. The method of claim 1 wherein the panel is a vehicle roof.

7. The method of claim 1 wherein the panel is a vehicle fender.

* * * * *